United States Patent
Blloshmi et al.

(10) Patent No.: US 9,518,164 B2
(45) Date of Patent: Dec. 13, 2016

(54) METHOD OF RECYCLING VULCANIZED RUBBER

(71) Applicants: Hysen Blloshmi, West Babylon, NY (US); Kastriot Blloshmi, West Babylon, NY (US)

(72) Inventors: Hysen Blloshmi, West Babylon, NY (US); Kastriot Blloshmi, West Babylon, NY (US)

( * ) Notice: Subject to any disclaimer, the term of this patent is extended or adjusted under 35 U.S.C. 154(b) by 58 days.

(21) Appl. No.: 14/699,278

(22) Filed: Apr. 29, 2015

(65) Prior Publication Data

US 2016/0083550 A1    Mar. 24, 2016

Related U.S. Application Data

(60) Provisional application No. 62/054,224, filed on Sep. 23, 2014, provisional application No. 62/078,277, filed on Nov. 11, 2014.

(51) Int. Cl.
| | |
|---|---|
| *C08J 11/04* | (2006.01) |
| *C08J 11/24* | (2006.01) |
| *B29B 17/00* | (2006.01) |

(52) U.S. Cl.
CPC ............ *C08J 11/24* (2013.01); *C08J 2319/00* (2013.01)

(58) Field of Classification Search
CPC .............. C08J 11/04; C08J 11/06; C08J 11/10
USPC ............................................................ 521/44
See application file for complete search history.

(56) References Cited

FOREIGN PATENT DOCUMENTS

| | | | | | |
|---|---|---|---|---|---|
| EP | 1279698 | * | 1/2003 | .............. | C08J 11/04 |
| JP | 2000127162 | * | 5/2000 | .............. | C08J 11/06 |
| WO | WO 2012017414 | * | 2/2012 | .............. | C08J 11/06 |

* cited by examiner

*Primary Examiner* — Terressa Boykin

(57) ABSTRACT

A method for recycling vulcanized rubber provided the use of a reactor and a glycerol and hydrochloric acid solution. A quantity of vulcanized rubber is reduced in size, and submerged into a reactor containing the glycerol and hydrochloric acid solution. The quantity of vulcanized rubber is simultaneously heated and agitated to chemically break sulfide bonds within the quantity of vulcanized rubber. A solid residue, byproduct of the reaction, is separated from the quantity of vulcanized rubber, glycerol, and hydrochloric acid mixture. After separation, an additional quantity of hydrochloric acid is added into the aforementioned mixture to wash the mixture and further the reaction to an optimal yield. The quantity of vulcanized rubber, glycerol and hydrochloric acid mixture is reheated and agitated to produce a full quantity of de-vulcanized rubber. The full quantity of de-vulcanized rubber is recovered through a solid-liquid separation process.

8 Claims, 2 Drawing Sheets

METHOD OF RECYCLING VULCANIZED RUBBER

The current application claims a priority to the U.S. Provisional Patent application Ser. No. 62/054,224 filed on Sep. 23, 2014 and claims a priority to the U.S. Provisional Patent application Ser. No. 62/078,277 filed on Nov. 11, 2014.

FIELD OF THE INVENTION

The present invention relates generally to recycling vulcanized rubber. More specifically, the present invention relates to a chemical process to break sulfide bonds within vulcanized rubber in order to restore various properties of virgin rubber and reduce the cost of production.

BACKGROUND OF THE INVENTION

Natural rubber consists of polymer of the organic compound Isoprene, with minor impurity of other organic compounds. Rubber has approximately the following composition: Water-55-70%, Rubber-30-40%, Resins-1.5-2%, Protein-1.5-2%, Ash-0.5-1%, Sugar-1-2%. Rubber is a polymer whose basic monomer is isoprene ($C_5H_8$). In 1839, Goodyear discovered that heating the rubber and sulfur together, a process called vulcanization, gave the rubber increased strength and elasticity and reduced its sensitivity to temperature. Natural rubber, when compared to synthetic, provides slightly better properties in tensile strength, tear resistance, compression, and flex fatigue resistance. Natural rubber is a polymer whose repeating unit is isoprene. The material is obtained by coagulation of latex derived from rubber tree. The molecular weight of natural rubber is in the order of 750.000 to 900.000 grams per mole. Consequently, natural rubber compounds tend to have high tensile and tear strength. Natural rubber is polymer designation 1-4 polyisoprene, empirical formula $(C_5H_8)N$. The first step in the tire manufacturing is the mixing of raw material to form the rubber compound natural and synthetic rubber, carbon black, sulfur and other chemical and oil. Rubber is water repellent and resistant to alkalis and weak acids. The advantages of natural rubber are less buildup of heat from flexing and greater resistance to tearing when hot. Track tires made from natural rubber are more resistant to cuts and tears and are more durable than made of synthetics. The physical characteristics of natural rubber, change as the temperature change, decomposes above 200 degrees Celsius is insoluble in water, alkali, and weak acid, but soluble in benzene, chlorinated hydrocarbon, and carbon disulfide. The heart of the vulcanization effect are the bonds which create what polymer scientists call cross-linkages, connecting the rubber molecules to one another in a unified network that is, for all practical purposes, no longer composed of separate molecular units. As Farris puts it, "a tire, or any rubber object, is basically one giant molecule". Some molecules are harder than others to dismantle, and subsequent generations of scientists have had to grapple with the near-impossibility of putting asunder what vulcanization has joined together.

Vulcanization is the process by which plastic rubber is converted into the elastic rubber or hard rubber state. The process, which is brought about by the linking of macromolecules at their reactive sites, is also known as cross-linking. Vulcanizing agents are substances that bring about the actual cross-linking process. Other properties, such as tensile strength, gas permeability, low temperature flexibility and electrical resistance, change less with the degree of vulcanization. During vulcanization the long chains of the elastomer chemically cross-link. Each cross-linking releases a quantum of energy, making it an exothermic reaction. During this process, the catalyst creates a three dimensional matrix. The energy released in the exothermal reaction is proportional to the cross-linked bonds formed and it is assumed that each bond releases the same energy. The vulcanization of the sample is found by measuring the energy released as the sample is heated from below room temperature to well above the vulcanization temperature. As it was first invented by Goodyear vulcanization used sulfur (About 8 parts by weight of sulfur mixed with 100 parts of natural rubber) at 140 degrees Celsius for about 5 hours. Vulcanization with sulfur alone is no longer used today, due to the long curing times. Vulcanization of rubber is a process by which natural rubber is enhanced by creating sulfide bridges between the molecular adjacent chains, to form a more tough and controllable material which can be manipulated to suit the requirement of a specific use. This heavily cross-linked polymer has strong forces between the chains, and is therefore an insoluble and infusible, thermosetting polymer. Rubber is an example of an elastomer type polymer, where the polymer has the ability to return to its original shape after being stretched or deformed.

Vulcanization is a chemical process by which the physical properties of natural or synthetic rubber are improved. Vulcanized rubber has higher tensile strength, increased resistance to swelling and abrasion, and is elastic over a range of temperatures. One of the disadvantages of the process is reversion of the sulfur. The reversion increases with an increase of the amount of sulfur. Raw and un-vulcanized rubbers are entangled high molecular weight visco-elastic. They are generally not very sticky, strong, brittle when cold, easily deformed when warm, and incapable of maintaining their shape after a large deformation. Raw rubbers are completely soluble in solvents and have a consistency similar to inelastic deformation being made of long polymeric chain that can move independently to each other. It is not possible to use uncured rubber to make articles with a good level of elasticity.

In the process of vulcanization, the added sulfur allows some carbon-hydrogen bonds to be broken and replaced by carbon-sulfur bonds. The cross-linked molecules create a three-dimensional network of rubber. Each cross-link is a chain of about eight sulfur atoms between two long chains of polyisoprene. Strength when rubber is vulcanized it become cross-linked in its chemical structure at the atomic level. This linking of stronger bonds makes vulcanized rubber 10 times stronger than natural rubber would be. Rigidity while vulcanized rubber is elastic meaning it will return to its original shape, it is also 10 times more rigid than normal rubber as a results of the vulcanization process. Rigidity means that vulcanized rubber is more difficult to bend out of shape in the first place, adding to its use in heavier application, such as tires. The vulcanization of natural rubber by sulfur in the presence of an organic accelerator is a complicated process. Vulcanization has been generally considered as irreversible.

Synthetic rubber is made from petroleum by the same polymerization techniques used to synthesize other polymers. Some of the commercially important addition polymers are the copolymers. These are polymers made by polymerizing a mixture of two or more monomers. An example is styrene-butadiene rubber (SBR) which is a copolymer of 1, 3 butadiene and styrene which is mixed in a 3 to 1 ratio respectively.

DETAIL DESCRIPTIONS OF THE INVENTION

All illustrations of the drawings are for the purpose of describing selected versions of the present invention and are not intended to limit the scope of the present invention.

Vulcanization is a process which strengthen and increases the rigidity of rubber. The present invention is a method of recycling vulcanized rubber in order to restore favorable properties, if not more desirable, of natural rubber to the material. For example, the "de-vulcanized" rubber would have a similar elasticity, tensile strength and abrasion resistance to natural rubber. De-vulcanized rubber can be a more cost effective alternative for natural rubber. The method of recycling vulcanized rubber requires a set of preliminary materials, which includes a quantity of vulcanized rubber, a glycerol and hydrochloric acid solution, and a reactor. The quantity of vulcanized rubber is the raw material input into the present invention from which the de-vulcanized rubber is produced from. The glycerol and hydrochloric acid solution provides favorable heat transfer properties as well as reacting with the quantity of vulcanized rubber in the process. Glycerol is the preferred solvent because glycerol is safe to handle and has a boiling point above the necessary temperatures for the process to occur. Hydrochloric acid is a necessary reagent to break the chemical bonds formed from the vulcanization process, specifically the sulfur-sulfur or carbon-sulfur bonds. The reactor is a vessel that does not structurally degrade through the contained reaction or the temperatures necessary for the reaction to occur.

Figure 1:
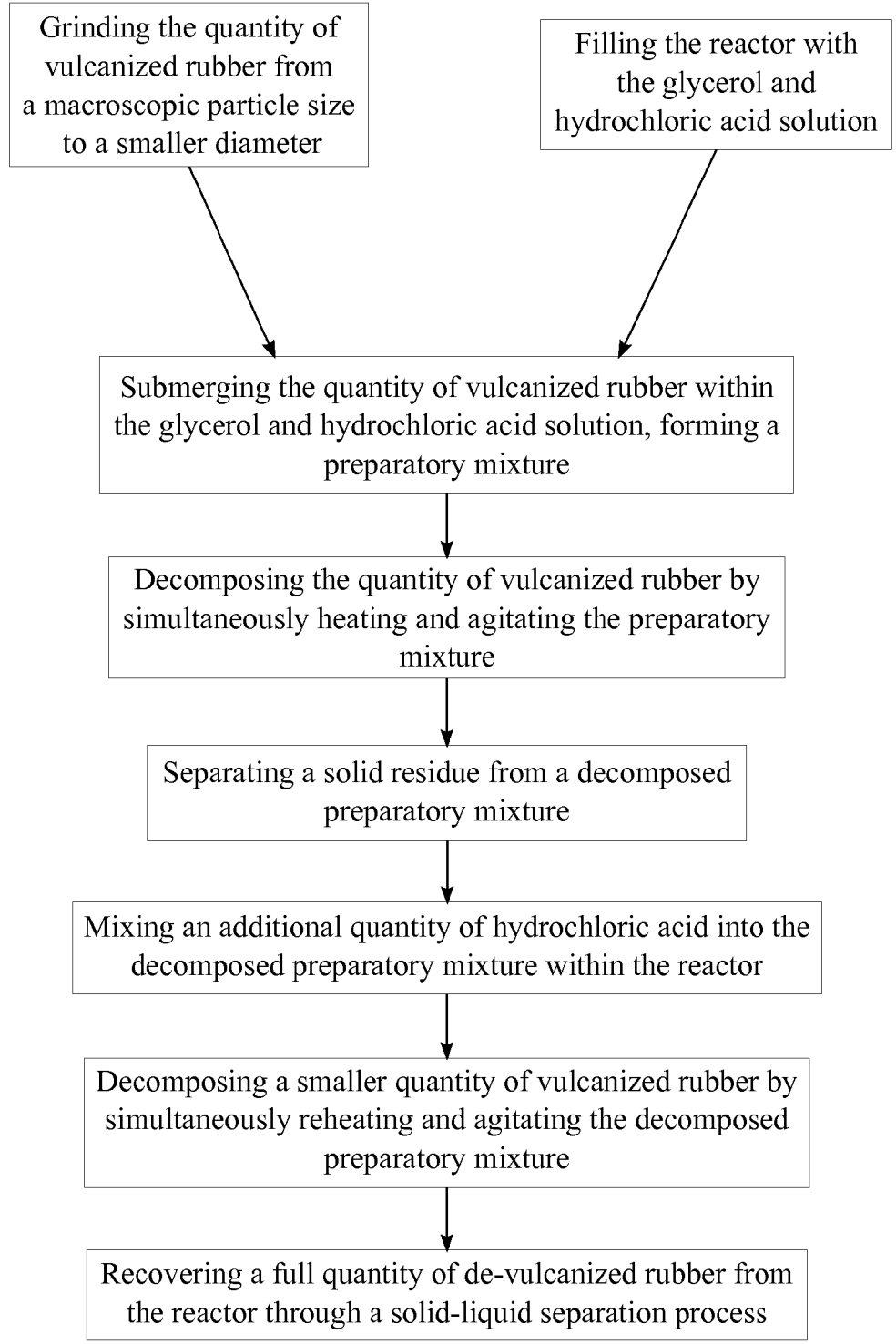
FIG. 1 is a box diagram of the general method of the present invention.
Figure 2:
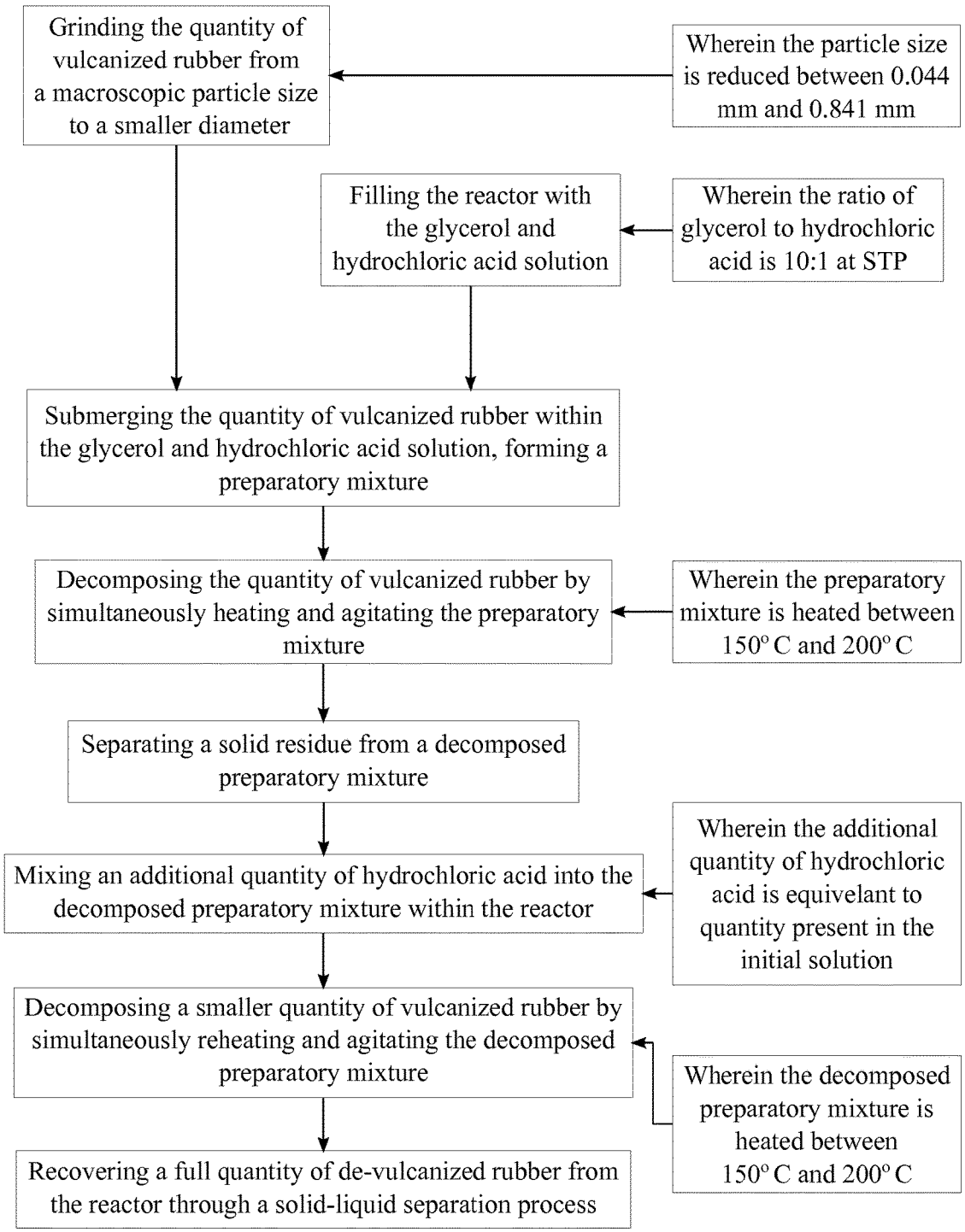
FIG. 2 is a box diagram specifying the preferred embodiment of the present invention.

In accordance to FIG. 1 and FIG. 2, the quantity of vulcanized rubber is first grounded from a macroscopic particle size to a smaller diameter. Grinding the quantity of vulcanized rubber increases the overall surface area of the vulcanized rubber that is in contact with the hydrochloric acid during the reaction. Thus, the reaction can occur faster and more efficiently as the hydrochloric acid will have more available contact points. It is preferred that the macroscopic particle size of the quantity of vulcanized rubber is reduced between 0.841 millimeters and 0.044 millimeters, or 20 to 325 mesh, such that a sufficient overall surface area is achieved.

In the meantime, the reactor is filled with the glycerol and hydrochloric acid solution. In accordance to the preferred embodiment, the glycerol and hydrochloric acid comprise an initial volumetric ratio of ten to one (10:1) at standard temperature and pressure (STP), and sufficient hydrochloric acid to begin the decomposition process for the quantity of vulcanized rubber. Once the reactor has been filled, the quantity of vulcanized rubber is submerged within the glycerol and hydrochloric acid solution, forming a preparatory mixture of the quantity of vulcanized rubber, the glycerol, and the hydrochloric acid, as well as possible dispersions of solid residues. The quantity of vulcanized rubber is then decomposed by simultaneously heating and agitating the preparatory mixture in order to chemically break sulfide bonds, such as sulfur-sulfur bonds as well as carbon-sulfur bonds, within the quantity of vulcanized rubber. The preparatory mixture is heated between 150 and 200 degrees Celsius, at these temperatures hydrochloric acid will react to break the sulfide bonds leaving the carbon-carbon bonds intact.

After a predetermined period of time has elapsed, preferred to be approximately four to six hours, the solid residue, or dispersion, is separated from a decomposed preparatory mixture, wherein the decomposed preparatory mixture includes a smaller quantity of vulcanized rubber, a quantity of de-vulcanized rubber, and the glycerol hydrochloric acid solution. The solid residue includes carbon black, silicon, clay, metals and several other compounds, providing the solid residue was used in the vulcanization process. The solid residue is removed from the decomposed preparatory solution through solid-liquid separation processes selected from, but may not limited to, a centrifuging process, decanting process, membrane separation process, or combinations thereof. In a centrifuge process, the decomposed preparatory mixture is spun at high speeds to separate the solid residue from the glycerol and hydrochloric acid solution, the decomposed quantity of vulcanized rubber, the smaller quantity of vulcanized rubber, and the quantity of de-vulcanized rubber based on the density for each of these substances. Decanting is typically performed subsequent to centrifuging, wherein the liquid portion of the mixture is poured off from the compacted solids, the solid residue, the smaller quantity of vulcanized rubber, and the quantity of de-vulcanized rubber, resulting from the centrifuge process. A membrane separation process allows for the removal of substances based on their size. In a membrane separation process, smaller substances pass through the membrane, for the present invention, allowing the glycerol and hydrochloric acid solution and the solid residue to pass through the membrane leaving the smaller quantity of vulcanized rubber and the quantity of de-vulcanized rubber on side of the membrane. The smaller quantity of vulcanized rubber and the quantity of de-vulcanized rubber is then reintroduced to the glycerol and hydrochloric acid solution after the solid residue is removed from glycerol and hydrochloric acid solution through similar solid-liquid separation processes.

Once the solid residue is removed from the decomposed preparatory mixture, an additional quantity of hydrochloric acid is mixed into the decomposed preparatory mixture within the reactor. In accordance to the preferred embodiment, the additional quantity of hydrochloric acid is mass equivalent to a quantity of hydrochloric acid present in the glycerol and hydrochloric acid solution. The additional quantity of hydrochloric acid is used to break further sulfide bonds within the now smaller quantity of vulcanized rubber. The smaller quantity of vulcanized rubber is decomposed by simultaneously reheating and agitating the decomposed preparatory mixture in order to chemically break sulfide bonds within the smaller quantity of vulcanized rubber. During this decomposition process, the decomposed preparatory mixture is reheated between 230 and 250 degrees Celsius in order to produce a full quantity of de-vulcanized rubber.

The full quantity of de-vulcanized rubber is recovered from the reactor through a solid-liquid separation process. The solid liquid processes are selected from, but may not limited to, a centrifuging process, decanting process, membrane separation process, or combinations thereof. Through, these solid liquid separation techniques, the full quantity of de-vulcanized rubber is separated from the glycerol and hydrochloric acid solution as well as from any residual solids such as carbon black, silica, clay, and metals that remained. The full quantity of de-vulcanized rubber can be used as a substitute in many processes which require natural rubber.

In order to increase the yield for the full quantity of de-vulcanized rubber all of the steps of the present invention may be repeated using the full quantity of de-vulcanized rubber. Repeating this process by replacing the quantity of vulcanized rubber with the full quantity of de-vulcanized rubber allows for additional sulfur-sulfur and carbon-sulfur bonds that were not previously broken to break during the steps including heating and agitating the mixture within the glycerol and hydrochloric acid mixture.

As previously mentioned, the present invention makes use of glycerol and hydrochloric acid solution, heating and agitation to facilitate the reaction. Crude glycerol is very cheap alcohol having a boiling point 290 degrees Celsius. Previous processes to de-vulcanize rubber requires 2-butanol, complicated equipment, large floor space, and excessive operating time. 2-Butanol is flammable, has a low flash point, and a boiling point about 98 and 100 degrees Celsius. By utilizing the process of the present invention, rubber crumb can be de-vulcanized using a simple technique without the need under pressure treatment, 2-butanol, alkali metal, microwave treatment, or ultrasonic wave treatment. While laboratory-scale operation worked well, industrial-scale installation were impractical through insufficient ultrasonic wave treatments.

After vulcanization, the cross-linked rubber becomes thermoset and cannot be reformed into other product. Using crude glycerol and a hydrochloric acid solution, temperatures between 150 and 200 degrees Celsius can be achieved for 4-5 hr. The rubber become soft. Thereby enabling it to be reprocessed and reshaped in manner similar to that employed with previously uncured elastomer.

The de-vulcanization technique does not significantly change the microstructure of the rubber and it can accordingly be used in the same types of application as was the original rubber. Thus, the rubber in the shell of the surface de-vulcanized rubber will be capable of again cured with sulfur and accordingly capable of being cured alongside virgin rubber.

Although the invention has been explained in relation to its preferred embodiment, it is to be understood that many other possible modifications and variations can be made without departing from the spirit and scope of the invention.

What is claimed is:

1. A method of recycling vulcanized rubber comprises the steps of:
   providing a quantity of vulcanized rubber, a glycerol and hydrochloric acid solution, and a reactor;
   grinding the quantity of vulcanized rubber from a macroscopic particle size to a smaller diameter;
   filling the reactor with the glycerol and hydrochloric acid solution;
   submerging the quantity of vulcanized rubber within the glycerol and hydrochloric acid solution in order to form a preparatory mixture;
   decomposing the quantity of vulcanized rubber by simultaneously heating and agitating the preparatory mixture in order to chemically break sulfide bonds within the quantity of vulcanized rubber;
   separating a solid residue from a decomposed preparatory mixture, wherein the decomposed preparatory mixture includes a smaller quantity of vulcanized rubber, a quantity of de-vulcanized rubber, and the glycerol and hydrochloric acid solution;
   mixing an additional quantity of hydrochloric acid into the decomposed preparatory mixture within the reactor;
   decomposing the smaller quantity of vulcanized rubber by simultaneously reheating and agitating the decomposed preparatory mixture in order to chemically break sulfide bonds within the smaller quantity of vulcanized rubber;
   and recovering a full quantity of de-vulcanized rubber from the reactor through a solid-liquid separation process.

2. The method of recycling vulcanized rubber, as claimed in claim 1, wherein the glycerol and hydrochloric acid solution comprises an initial volumetric ratio of glycerol to hydrochloric acid at 10:1 at standard temperature and pressure (STP).

3. The method of recycling vulcanized rubber, as claimed in claim 1, wherein the macroscopic particle size of the quantity of vulcanized rubber is reduced between 0.841 mm and 0.044 mm.

4. The method of recycling vulcanized rubber, as claimed in claim 1, wherein the preparatory mixture is heated between 150 and 200 degrees Celsius.

5. The method of recycling vulcanized rubber, as claimed in claim 1, wherein the additional quantity of hydrochloric acid is mass equivalent to a quantity of hydrochloric acid present in the glycerol and hydrochloric acid solution.

6. The method of recycling vulcanized rubber, as claimed in claim 1, wherein the decomposed preparatory mixture is reheated between 230 and 250 degrees Celsius.

7. The method of recycling vulcanized rubber, as claimed in claim 1, wherein the reclaimed rubber and the glycerol and hydrochloric acid solution is heated between 4 to 6 hours.

8. The method of recycling vulcanized rubber, as claimed in claim 1, the solid-liquid separation process is selected from a group consisting of: a centrifuging process, a decanting process, a membrane separation process or combinations thereof.

* * * * *